(12) United States Patent
Antoine et al.

(10) Patent No.: US 6,484,030 B1
(45) Date of Patent: Nov. 19, 2002

(54) HANDOVER FROM A MICROCELL LAYER TO A MACROCELL LAYER IN A TWO-LAYER CELL OF A TELECOMMUNICATION NETWORK

(75) Inventors: Jacques Antoine, Chatillon (FR); Armelle Wautier, Gif sur Yvette (FR); Jérôme Brouet, Paris (FR); Patrick Charriere, Wilts (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/388,623

(22) Filed: Sep. 2, 1999

(30) Foreign Application Priority Data

Mar. 9, 1998 (FR) .............................. 98 11018

(51) Int. Cl.⁷ .................................. H04Q 7/20
(52) U.S. Cl. ........................... 455/444; 455/436
(58) Field of Search .................. 455/436, 439, 455/442, 443, 444, 445, 446, 449–452, 7, 13.1, 561, 26.1

(56) References Cited

U.S. PATENT DOCUMENTS

| | | | | |
|---|---|---|---|---|
| 5,513,380 A | * | 4/1996 | Ivanov et al. | 455/444 |
| 5,579,374 A | * | 11/1996 | Doi et al. | 455/444 |
| 5,913,168 A | * | 6/1999 | Moreau et al. | 455/444 |
| 5,937,353 A | * | 8/1999 | Fapojuwo | 455/444 |
| 6,192,245 B1 | * | 2/2001 | Jones et al. | 455/444 |
| 6,205,132 B1 | * | 3/2001 | Hong et al. | 370/342 |
| 6,278,881 B1 | * | 8/2001 | Balck | 455/436 |

FOREIGN PATENT DOCUMENTS

| EP | 0 526 436 A1 | 2/1993 |
|---|---|---|
| WO | WO 97/13386 | 4/1997 |

OTHER PUBLICATIONS

Mouly M. et al. "The GSM System for Mobile Communications" Aug. 1993, GSM System for Mobile Communications, pp. 616–628, Mouly M.; Pautet M–B XP002101320.

* cited by examiner

Primary Examiner—William Trost
Assistant Examiner—Simon Nguyen
(74) Attorney, Agent, or Firm—Sughrue Mion, PLLC

(57) ABSTRACT

In a method of communicating with a mobile station in a cell of a cellular telecommunication network having a microcell layer with a plurality of microcells each comprising at least one relay station and a macrocell layer with a macrocell covering a plurality of microcells, a call in the microcell layer is effected between the mobile station and a set of relay stations, the number of which is a cardinal number at least equal to two, allocated to the call. The relay stations allocated to the call can change during the call, and the call is handed over from the microcell layer to the macrocell layer when it is not possible to allocate to the call a number of relay stations corresponding to the cardinal number. A base transceiver station for implementing the invention is also disclosed.

12 Claims, 3 Drawing Sheets

HANDOVER FROM A MICROCELL LAYER TO A MACROCELL LAYER IN A TWO-LAYER CELL OF A TELECOMMUNICATION NETWORK

BACKGROUND OF THE INVENTION

1. Field of the Invention

The invention concerns the field of mobile telecommunication networks or mobile radio networks and more particularly networks using TDMA (time division multiple access) digital transmission.

2. Description of the Prior Art

These networks are made up of cells each comprising a base transceiver station responsible for providing communication with mobile stations in the cell. Various standards have already been drawn up for terrestrial telecommunication systems with mobile terminals, in particular the GSM, DCS 1800 and PCS standards. Under the GSM standard, each base transceiver station (BTS) transmits signaling messages in a cell on a broadcast control channel (BCCH). The broadcast control channel also identifies the cell. A random access channel (RACH) is used for signaling messages from the mobile stations. The mobile stations use this channel during a call initialization phase to send either a request (uplink call) or an acknowledgement message (downlink call).

The invention is more particularly concerned with cells with two layers. These cells have a macrocell layer and a microcell layer. In such cells, the macrocell layer is used to manage the mobile stations at cell level. The microcell layer is used to manage the mobile stations at micro-BTS level. Each micro-BTS radiates at a low power in the microcell that it defines, which typically has a size of a few hundred meters, compared to a typical size in the order of one kilometer for a cell or macrocell.

This design and this structure of the cells increases traffic capacity or alleviates transmission problems encountered in urban environments. However, the resulting improvement is greater if the mobile stations are managed in the microcell layer. An objective in cells with distributed antennas is therefore to assure as much transmission to and from the mobile stations in the microcell layer as possible. It is nevertheless still possible to transmit to and from the mobile stations in the macrocell layer. To handover from the microcell layer to the macrocell layer, it has been proposed to estimate the speed of the mobile stations and to use that speed in the decision whether to handover from the microcell to the macrocell. In this case, the mobile stations which are stationary or moving at low speed are managed in the microcell layer and fast-moving mobile stations are managed in the macrocell layer. This solution is described in ETSI recommendation TS GSM 05.22 version 4.00, for example. This recommendation proposes to evaluate the speed by the time spent in the cell.

French patent application 97 11123 filed Sep. 8, 1997 by the assignees of the inventors, whose title in translation is "Base transceiver station controlling calls used in a cell of a digital cellular mobile radio network, and corresponding control method", which had not been published by the date of filing of this application, describes a distributed radio coverage system. The above application proposes that each cell comprise a plurality of relay stations. Also, calls to a mobile station of the cell are allocated a set of at least two relay stations. The relay stations of the same cell use the same BCCH and RACH.

French patent application 97 11125 filed Sep. 8, 1997 by the assignees of the inventors, and whose title in translation is "Method of identifying a mobile station in a cell of a digital cellular mobile radio network", which also had not been published at the date of this application, describes a distributed radio coverage system. The above application proposes that each cell comprise a plurality of relay stations. It proposes to select at least one of the relay stations of a cell in accordance with the quality of a call from a mobile station, in order to determine a position of this mobile station in the cell. The relay stations of the same cell use the same BCCH and RACH.

The invention proposes a solution to the problem of redirecting traffic from the microcell layer to the macrocell layer in distributed cells. It maximizes traffic efficiency and use of microcell resources and provides a good grade of service (GoS).

SUMMARY OF THE INVENTION

To be more precise, the invention proposes a method of communicating with a mobile station in a cell of a cellular telecommunication network having a microcell layer with a plurality of microcells each comprising at least one relay station and a macrocell layer with a macrocell covering a plurality of said microcells, wherein a call in the microcell layer is effected between the mobile station and a set of relay stations, the number of which is a cardinal number at least equal to two, allocated to the call, the relay stations of the set allocated to a call can change during the call, and the call is handed over from the microcell layer to the macrocell layer when it is not possible to allocate to the call a number of relay stations corresponding to said cardinal number.

Said cardinal number is advantageously 2.

In one embodiment, the macrocell comprises means for managing the equivalent of a number $N_{macro}$ of transmitter-receivers and said number is chosen so that the grade of service is less than or equal to 2%.

The invention also concerns a base transceiver station for a cell of a telecommunication network having a microcell layer with a plurality of microcells each comprising at least one relay station and a macrocell layer with one macrocell covering a plurality of said microcells, means for allocating a set of relay stations to a call in the microcell layer, the number of which is a cardinal number at least equal to two, allocated to the call, said allocation means allocating different relay stations to a mobile station in movement, and the base transceiver station further including means for handing over a call from the microcell layer to the macrocell layer when it is not possible to allocate to the call a number of relay stations corresponding to said cardinal number.

The cardinal number is preferably 2.

In one embodiment, the layer comprises means for managing the equivalent of a number $N_{macro}$ of transmitter-receivers and in that said number is chosen so that the grade of service is less than or equal to 2%.

Other features and advantages of the invention will become apparent on reading the following description of embodiments of the invention which is given by way of example and with reference to the accompanying drawings.

DETAILED DESCRIPTION OF THE PREFERRED EMBODIMENT

In the remainder of the description, the invention is described with particular reference to the GSM and for the situation in which each call is assigned to a set of two antennas or relay stations, as described in the aforementioned patent application by the assignees of the inventors. The invention also applies to other types of networks and to the situation in which more than two relay stations are assigned per call. It is particularly appropriate to the situation described hereinafter of microcells having a plurality of relay stations, as in the aforementioned patent applications 97 11123 and 97 11125.

Figure 1:
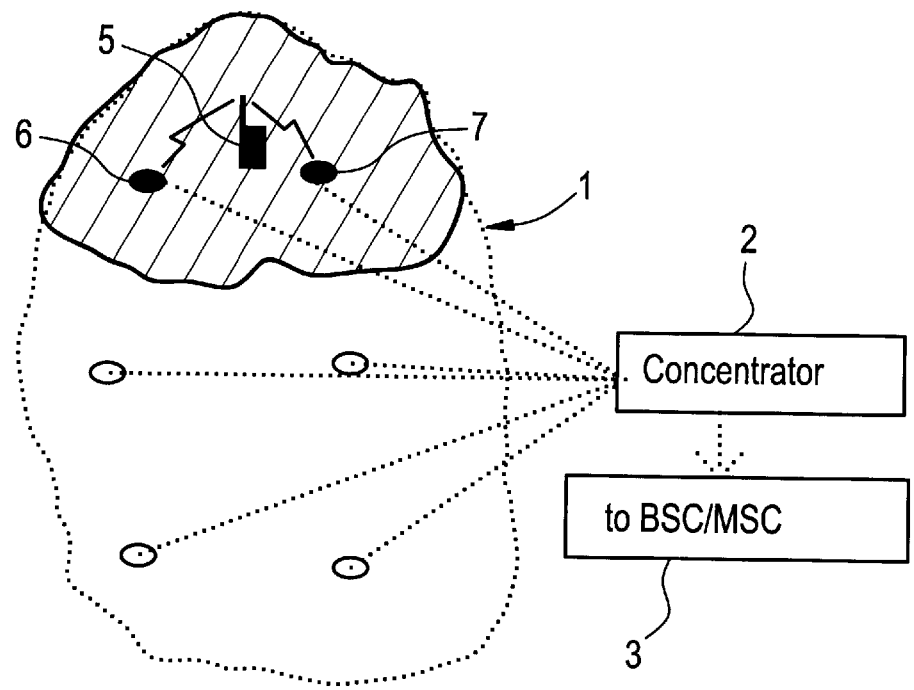
FIG. 1 is a diagrammatic representation of a cell with distributed relay stations in which the invention is implemented.

FIG. 1 is a diagrammatic representation of a microcell of a cell with distributed relay stations in which the invention is implemented. The microcell 1 in FIG. 1 includes a concentrator 2 and a plurality of relay stations or antennas—there are six of them in FIG. 1—which are connected to the concentrator 2. The set of relay stations and the concentrator forms the micro-BTS of the microcell.

FIG. 1 also shows the base station controller (BSC) 3 of the macrocell, to which the concentrator 2 of the microcell is connected.

FIG. 1 shows a mobile station 5. Communication with the mobile station 5 is handled by a pair of relay stations comprising the two relay stations 6 and 7 shown black in the figure. Those two relay stations are active for that call and define a coverage area which is shown cross-hatched in FIG. 1. The other relay stations, shown white in FIG. 1, are inactive for the call involving the mobile station 5.

This solution means that the location of the mobile station 5 within the microcell can be determined at any time, on the basis of the set of relay stations via which the mobile station is communicating. In the FIG. 1 example, and as explained above, the mobile station 5 is in the cross-hatched area when the call is handled by the two relay stations 6 and 7.

At call set-up time, uplink and downlink calls are managed in the microcell layer. A conventional resource allocation strategy can be used for this, and has no influence on the implementation of the invention. The channel selection strategy employed can in particular be that described by P. Charriere and J. Brouet in "Optimum channel selection strategies for mobility management in high traffic TDMA-based networks with distributed coverage", ICPWC'97, December 1997. The call can also come from an adjoining cell, and result from a handover or negotiation to one or more relay stations of the cell in question. In either case, allocating the call to a set of relay stations defines an area in which the mobile station is located, i.e. determines the location of the mobile station within the cell.

The mobile station 5 can change area while the call is in progress if the set of relay stations to which the call is allocated happens to change. One mechanism for determining whether it is necessary to change area or to change to a different set of relay stations is described in the aforementioned patent application by the assignees of the inventors and consists in listening to the call at a plurality of relay stations on the uplink and comparing the reception quality at the various relay stations in order to select a set of relay stations. This solution allocates a different set of two relay stations to a call if the mobile station moves.

The invention proposes to handover the call from the microcell layer to the macrocell layer if it is no longer possible to allocate two relay stations to a call involving a mobile station. This amounts to handing over to the macrocell layer if the resources in the microcell layer are insufficient to assure multisite coverage of the mobile station.

Compared to the prior art, the invention therefore proposes to use the resources available in the network, instead of the speed. It enables full use of the negotiation or handover capacities in the microcell layer and full use of the resources of the microcell layer, redirecting the call to the macrocell layer only if there is a lack of resources.

Figure 2:
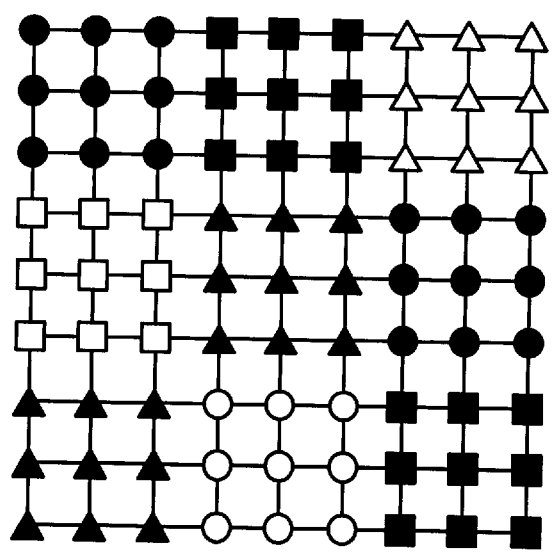
FIG. 2 is a diagrammatic representation of a cell used to evaluate the results of using the invention.

FIG. 2 is a diagrammatic representation of a cell used to evaluate the results of using the invention. The cell covers an urban environment typical of that of Manhattan, with perpendicular streets at a spacing of 100 m. The cell comprises nine microcells each of which comprises nine relay stations and a concentrator. Each relay station can provide the equivalent of one transmitter-receiver TRx, i.e. eight time slots (TS). Each concentrator is adapted to manage the equivalent of $N_{seq}$ transmitter-receivers. The macrocell covers all of the service area and can manage the equivalent of $N_{macro}$ transmitter-receivers.

The FIG. 2 network was simulated using previously developed propagation models allowing for line of sight communication and non line of sight communication. The distances between relay stations and the transmitted powers were varied so that each time slot of a relay station was able to provide one interference-free channel for each mobile station. The solution proposed by Y. Begassat and V. Kumar in "Interference analysis of an original TDMA-based high density cellular radio network", VTC'98, May 1998, can be used for this purpose. It is also assumed that there is complete coverage of the macrocell.

Figure 3:
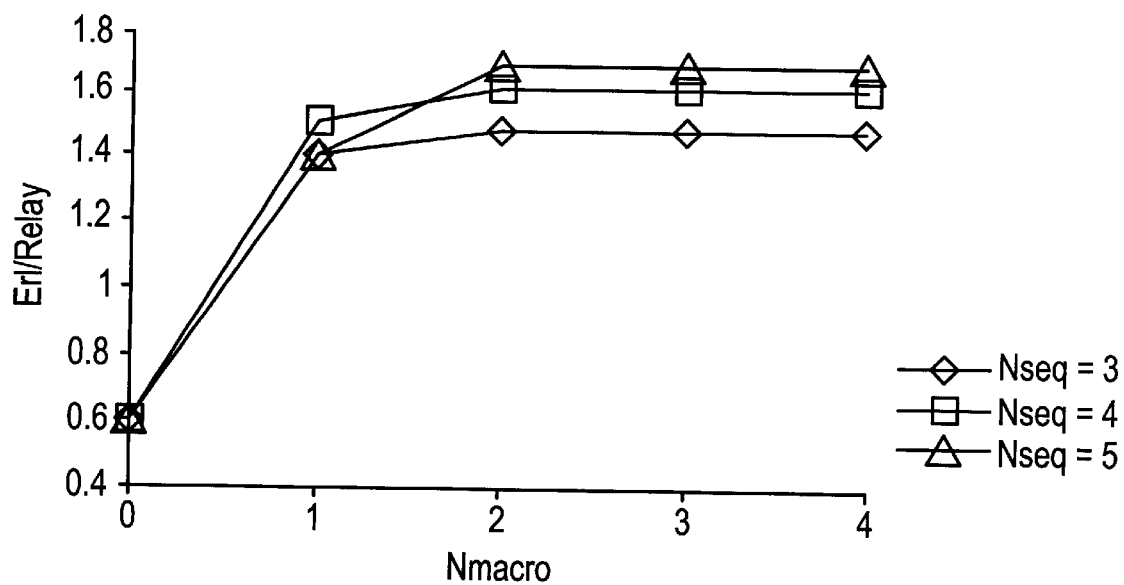
FIGS. 3 to 5 are graphs of traffic per relay station in accordance with the invention.
Figure 4:
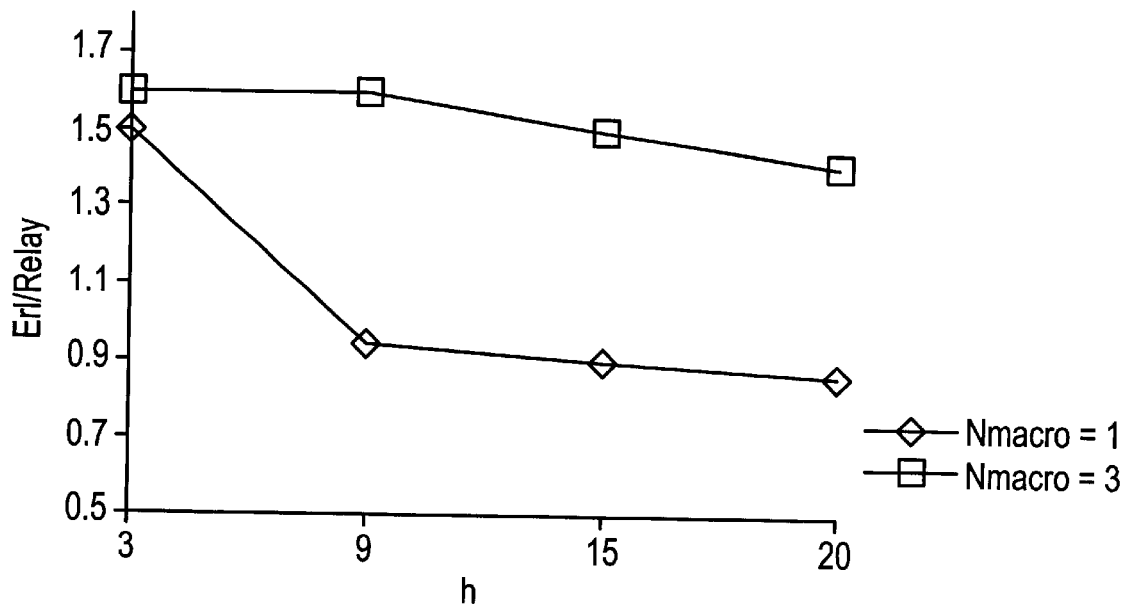
Figure 5:
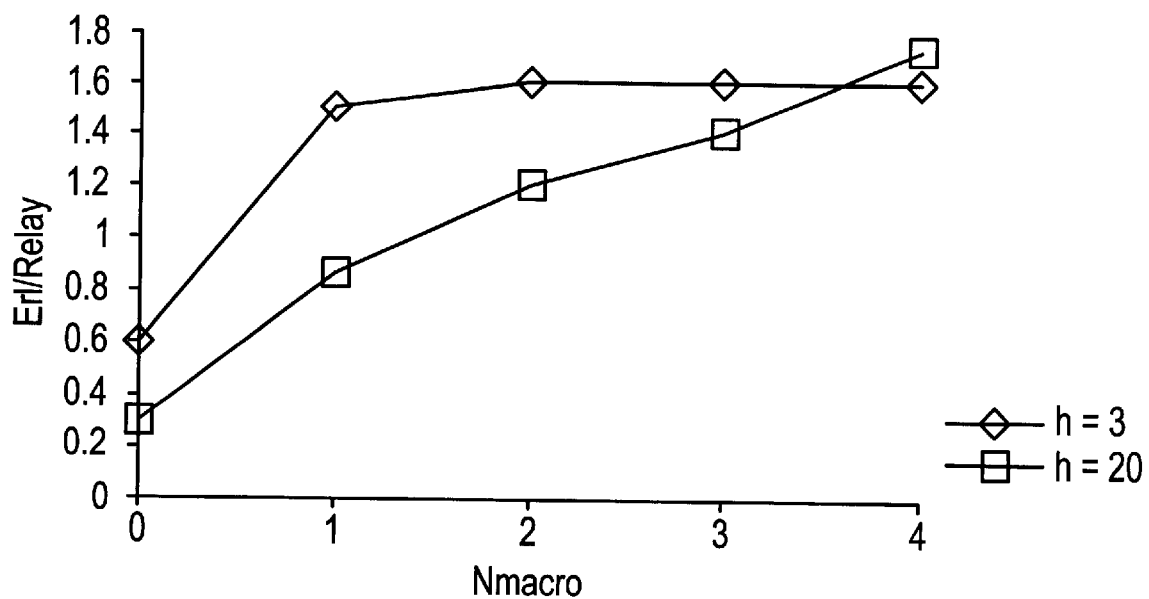

FIGS. 3 to 5 show simulation results in a network of the above kind, subject to the following hypotheses as to the traffic per mobile station and the mobile station population. For simplicity, only voice traffic was considered, with incoming calls arriving in accordance with Poisson's law and call durations obeying a negative exponential law. Each mobile station generated on average each hour a call of 120 s duration, representing a load of 33 mErl per mobile station. With the above traffic hypotheses, a mobile station population was considered in which 70% of the mobile stations were fixed and the remaining mobile stations were moving at the same speed. A moving mobile station could continue in the same direction at each intersection, or turn left, or turn right, all with the same probability.

The graphs shown in FIGS. 3 to 5 were based on a grade of service GoS conventionally defined as the sum of the blocking probability $P_b$ and ten times the failed call probability $P_{fct}$:

$$GoS = P_b + 10 \cdot P_{fct}$$

A call is blocked in the absence of physical resources for an incoming call, in other words when the relay stations in the area in which the mobile station is located and the resources at macrocell level are saturated. A call fails if the handover or negotiation fails or if the handover from the microcell level to the macrocell level fails. A target value of 2% was considered for the grade of service GoS for an external system and therefore, in the figures, a blocking probability less than 1% and a failed call probability less than 0.1%.

Given the above hypotheses, FIG. 3 shows a graph of the traffic per relay station as a function of the number $N_{macro}$ of transmitter-receiver equivalents that a macrocell can manage. The traffic per relay station, in Erlangs per relay station, is plotted on the ordinate axis. The number $N_{macro}$ is plotted on the abscissa axis. The curve with the diamonds corresponds to a number $N_{seq}=3$ and the curve with the rectangles corresponds to a number, $N_{seq}=4$, while the curve with the circles corresponds to a number $N_{seq}=5$. For the FIG. 3 graph, a speed h=3, i.e. 9 kph in the model was considered.

FIG. 3 shows that the invention achieves a value of traffic per relay station in the microcell layer of 1.6 Erlangs per relay station, from a value of $N_{macro}$ of 2, regardless of the value of the number $N_{seq}$.

FIG. 4 shows analogous graphs but as a function of the speed of the mobile stations. The abscissa axis therefore plots the speed, in terms of the number of areas crossed during the duration of the call. The curve with the circles corresponds to a number $N_{macro}=1$ and the curve with the rectangles corresponds to a number $N_{macro}=3$. The value of $N_{seq}$ is immaterial, and was 4 for the calculations shown in FIG. 4.

FIG. 4 shows that the traffic per relay station fell strongly—by approximately 40%—as the speed increased from h=3 or 9 kph to h 15 or 45 kph, for a value of $N_{macro}$ of 1. On the other hand, for a value of $N_{macro}$ of 3, the variation of the traffic per relay station for similar variations in the speed were only in the order of 6%. Again, in FIG. 4, an appropriate choice of the number of transmitter-receiver equivalents that the cell can manage limits the influence of the speed of the mobile stations. The invention is therefore particularly beneficial when applied to urban areas in which the density of mobile stations is high and in which the speeds can vary. The invention is therefore suitable for automobile traffic areas in towns.

FIG. 5 shows graphs of the traffic as a function of the number $N_{macro}$, plotted on the abscissa axis, for various values of the speed. The curve with the squares represents the situation with h=20, i.e. a speed of 60 kph, and the curve with the circles corresponds to h=3, i.e. 9 kph. Note that the traffic values per relay station are again substantially identical for values of $N_{macro}$ in the order of 4. For the FIG. 5 calculations, $N_{seq}=4$.

The graphs of FIGS. 3 to 5 show that the invention can optimize the traffic per relay station, for given traffic hypotheses, for a given population of mobile stations and for a given network architecture. To be more precise, retaining the same grade of service, it optimizes the use of resources and caters for the maximum traffic, thanks to an appropriate choice of the resources of the cell.

The invention therefore proposes to choose transmitter-receiver equivalents which the macrocell layer can manage so as to ensure that the grade of service GoS is less than or equal to 2%, in conjunction with optimizing the traffic per relay station. The value of the GoS is measured by evaluating in a conventional way the blocking probability and the failed call probability.

Of course, the present invention is not limited to the examples and embodiments described and shown and is open to many variations that will suggest themselves to the skilled person. It is to be understood that the invention can be implemented for network configurations other than those described and can provide results different from those obtained with reference to the figures for different traffic or mobile station population hypotheses. It also applies not only to allocating two mobile stations to a given call but more generally to allocating a set of relay stations to a call: the call is handed over from the microcell layer to the macrocell layer when the resources can no longer allocate a complete set of relay stations to a call.

What is claimed is:

1. A method of communicating with a mobile station in a cell of a cellular telecommunication network having a microcell layer with a plurality of microcells each comprising at least one relay station and a macrocell layer with a macrocell covering a plurality of said microcells, wherein a call in the microcell layer is continuously effected between the mobile station and a set of relay stations, the number of which is a cardinal number at least equal to two, allocated to the call, the relay stations of the set allocated to the call can change during the call, and the call is handed over from the microcell layer to the macrocell layer when it is not possible to allocate to the call a number of relay stations corresponding to said cardinal number.

2. The method claimed in claim 1 wherein said cardinal number is 2.

3. The method claimed in claim 1 wherein the macrocell layer comprises means for managing the equivalent of a number of transmitter-receivers and said number is chosen so that the grade of service is less than or equal to 2%.

4. A base transceiver station for a cell of a telecommunication network having a microcell layer with a plurality of microcells each comprising at least one relay station and a macrocell layer with one macrocell covering a plurality of said microcells, means for continuously allocating a set of relay stations to a call in the microcell layer, the number of which is a cardinal number at least equal to two, allocated to the call, said allocation means allocating different relay stations to a mobile station in movement, and the base transceiver station further including means for handing over a call from the microcell layer to the macrocell layer when it is not possible to allocate to the call a number of relay stations corresponding to said cardinal number.

5. The base transceiver station claimed in claim 4 wherein the cardinal number is 2.

6. The station claimed in claim 4 wherein the macrocell layer comprises means for managing the equivalent of a number of transmitter-receivers and said number is chosen so that the grade of service is less than or equal to 2%.

7. A method of communicating with a mobile station in a cell of a cellular telecommunication network having a microcell layer with a plurality of microcells each comprising at least two relay stations and a macrocell layer with a macrocell covering a plurality of said microcells, wherein a call in a microcell of the microcell layer is continuously effected between the mobile station and a set of relay stations within said microcell allocated to the call, the number of which is a cardinal number at least equal to two, wherein the relay stations of the set allocated to the call can change during the call, and the call is handed over from the microcell layer to the macrocell layer when it is not possible to allocate to the call a number of relay stations corresponding to said cardinal number.

8. The method claimed in claim 7, wherein said cardinal number is 2.

9. The method claimed in claim 7, wherein the macrocell layer comprises means for managing the equivalent of a number of transmitter-receivers and said number is chosen so that the grade of service is less than or equal to 2%.

10. A base transceiver station for a cell of a telecommunication network having a microcell layer with a plurality of microcells each comprising at least two relay stations and a macrocell layer with one macrocell covering a plurality of said microcells, means for continuously allocating a set of relay stations in a microcell of said microcell layer to a call in said microcell layer, the number of which is a cardinal number at least equal to two, said allocation means allocating different relay stations to a mobile station in movement, and the base transceiver station further including means for handing over a call from the microcell layer to the macrocell layer when it is not possible to allocate to the call a number of relay stations corresponding to said cardinal number.

11. The base transceiver station claimed in claim 10, wherein said cardinal number is 2.

12. The base transceiver station claimed in claim 10, wherein the macrocell layer comprises means for managing the equivalent of a number of transmitter-receivers and said number is chosen so that the grade of service is less than or equal to 2%.

\* \* \* \* \*